Patented Nov. 8, 1932

1,887,097

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REFINING ROSIN

No Drawing.  Application filed September 12, 1930.  Serial No. 481,600.

My invention relates to an improved method for effecting the refining of rosin. The method in accordance with my invention is especially advantageous for the refining of wood rosin, but may also be applied to the refining of gum rosin.

As is well known, wood rosin such as is obtained from dead pine wood, as stump wood, by extraction with a solvent, is ordinarily dark in color due to the presence of visible coloring matter and contains substances, referred to as latent color bodies, which while normally invisible, will darken under certain conditions, as in the presence of air and an alkali.

Gum rosin contains more or less visible color bodies and in the lower grades not infrequently also contains latent color bodies.

The presence of latent color bodies in rosin is a serious disadvantage, since they render rosin in which they are contained unusable where the maintenance of a light color is demanded and the rosin or product including it, as soaps, varnishes, sizes, etc., is subjected to conditions under which the latent color bodies will darken.

Now, in accordance with my present invention, I provide a method whereby latent color bodies may be substantially removed from rosin in which they are contained. The method in accordance with my invention will also effect the substantial removal of visible color bodies and hence while it is more particularly advantageous for the refining of wood rosin and of gum rosin containing latent color bodies, it may be applied to the refining of rosin generally.

From the broad standpoint, the method in accordance with my invention involves the treatment of rosin with a metallic chloride having a capacity for removing or enabling the separation of latent color bodies from rosin containing such color bodies. More specifically, the metallic chloride will be preferably anhydrous and may, for example, be a chloride of zinc, tin, titanium, antimony, and the like.

In carrying out the method in accordance with my invention, the rosin will be desirably treated in solution in a suitable solvent, as gasoline, or other light petroleum distillate, mineral spirits, etc., it being noted that the solvent acts merely as a carrier or dispersant enabling desirable contact between the rosin and the metallic chloride.

In carrying out the method the mixture of rosin and metallic chloride may be agitated at room temperature, or, if desired, may be heated to a temperature such as will facilitate the refining action without causing the formation of any considerable amount of polymerized rosin, or of rosin oil. If heat is applied the temperature will depend upon the activity of the metallic chloride, but generally speaking will be within say about the range 0° C.–150° C. For example, a temperature of about 125° C., will facilitate the refining action where anhydrous zinc chloride is used, while a temperature of about 40° C. will be desirable when using anhydrous fuming stannic chloride.

In carrying the method into practice, a suitable metallic chloride, preferably anhydrous, is added to a suitable rosin solution and the mixture heated, if desired, and agitated for a period after which the rosin solution is filtered or otherwise separated from a precipitate formed and containing or carrying with it color bodies of the rosin. The filtered rosin solution may be desirably washed with water, the solvent evaporated and the rosin may, if desired, be distilled under a vacuum with avoidance of any substantial decomposition.

If desired, the rosin solution may be given a preliminary treatment with a metallic chloride at room temperature, filtered and then heated with a fresh addition of metallic chloride. If desired, the rosin solution and metallic chloride may be refluxed, where certain chlorides, as zinc chloride, are used and the activity of which is not such as to cause any considerable polymerization or the formation of rosin oil at a refluxing temperature.

As illustrative of the practical adaptation of my invention, for example, about 15 parts of anhydrous zinc chloride are admixed with 500 parts of a solution of wood rosin in gasoline, containing say about 13% of rosin, and agitated for about fifteen hours at room temperature. The gasoline-rosin solution is then filtered to separate it from the brown precipitate, which is formed and which contains color bodies removed from the rosin. The gasoline-rosin solution is then washed with water and the gasoline evaporated leaving refined rosin. If desired, the rosin may then be distilled under a vacuum of say about 2 inches of mercury.

As a further illustration, for example, 10 grams of anhydrous zinc chloride may be admixed with 500 parts of a 13% solution of wood rosin and the mixture refluxed at a temperature of say about 125° C. for a perior of about six hours. The mixture is then filtered, the rosin solution washed with water, the gasoline evaporated and, if desired, the rosin distilled as in the above example.

As a further illustration, for example, 11 parts by weight of anhydrous fuming stannic chloride are added to 600 grams of a 12% solution of wood rosin in gasoline and the mixture agitated at a temperature of say about 25° C.–30° C. for six hours. The gasoline-rosin solution is then separated from the precipitate formed and containing color bodies washed with water and the gasoline evaporated leaving refined rosin. Alternatively, 5 parts by weight of stannic chloride are added to 800 parts of a gasoline-rosin solution, the mixture agitated at about 25° C. for four hours and refined rosin may be recovered as described. The refined rosin may be distilled as indicated, if desired. Again, 10 cc. of antimony pentachloride are added to 600 gms. of gasoline-rosin solution and the mixture agitated at about 35° C. for about two hours. After separation of the solution from the precipitate, the solution is washed with water and the refined rosin, amounting to about 61 gms. grading H, recovered by evaporation off of the gasoline.

The rosin solution after treatment with a metallic chloride may, if desired, be agitated, or otherwise treated with fullers' earth, activated carbon, or the like, if desired, and the rosin subsequently recovered as described.

The rosin treated in accordance with my invention will be found to be of improved color and to be largely freed from latent color bodies, where such were present in the rosin treated. Further, the rosin treated, and especially wood rosin, will be found to be available for the production of soaps, varnishes, sizes, etc.

It will be understood that the herein described procedure for carrying out the method embodying my invention may be varied without departing from my invention and it will be understood that I contemplate as within the scope of my invention various metallic chlorides not herein specifically mentioned and which are operable equivalents for those mentioned, which are operable equivalents for each other.

What I claim and desire to protect by Letters Patent is:

1. The method of refining rosin which includes admixing an anhydrous metallic chloride capable of removing color bodies from rosin with a solution of rosin in a suitable solvent, heating the mixture at a temperature below that which will cause the formation of any substantial amount of rosin oil, separating the rosin solution from the precipitate formed and separating the rosin from its solvent.

2. The method of refining rosin which includes admixing zinc chloride with a solution of rosin in a suitable solvent, refluxing the mixture, separating the rosin solution from the precipitate formed and separating the rosin from its solvent.

3. The method of refining rosin which includes admixing an anhydrous metallic chloride capable of removing color bodies from rosin with a solution of rosin in a suitable solvent, heating to a temperature within the range about 25° C.–30° C. while agitating the mixture, separating the rosin solution from the precipitate formed and separating the rosin from its solvent.

4. The method of refining rosin, which includes admixing an anhydrous metallic chloride capable of removing color bodies from rosin with a solution of rosin and gasoline, heating the mixture at a temperature below that which will cause the formation of any substantial amount of rosin oil, separating the rosin from the precipitate formed and separating the rosin from its solvent.

5. The method of refining rosin, which includes admixing anhydrous zinc chloride with a solution of rosin in a suitable solvent, separating the rosin solution from the precipitate formed and separating the rosin from the solvent.

6. The method of refining rosin, which includes admixing anhydrous zinc chloride with a solution of rosin in a suitable solvent, heating the mixture at a temperature below that which will cause the formation of any substantial amount of rosin oil, separating the rosin solution from the precipitate formed and separating the rosin from the solvent.

7. The method of refining rosin, which includes admixing an anhydrous metalic chloride with a solution of rosin in a suitable solvent, heating the mixture at a temperature below that which will cause the formation of any substantial amount of rosin oil, treating the rosin solution with fullers' earth and separating the rosin from its solvent.

8. The method of refining rosin, which includes admixing anhydrous zinc chloride with a solution of rosin in a suitable solvent, treating the rosin solution with fullers' earth, separting the rosin solution from the fullers' earth and separating the rosin from its solvent.

In testimony of which invention, I have hereunto set my hand, at Kenvil, N. J., on this 6th day of September, 1930.

IRVIN W. HUMPHREY.